US008690090B2

(12) United States Patent
Kulesa et al.

(10) Patent No.: US 8,690,090 B2
(45) Date of Patent: Apr. 8, 2014

(54) POST CONSUMER SCRAP FILM RECYCLING SYSTEM

(71) Applicant: Wisconsin Film & Bag, Inc., Shawano, WI (US)

(72) Inventors: Robert Francis Kulesa, Green Bay, WI (US); James J. Feeney, Appleton, WI (US); Richard Wayne Carlstedt, Green Bay, WI (US); Daniel William Blake, Menasha, WI (US); Buckell Gary Hacker, Shawano, WI (US)

(73) Assignee: Wisconsin Film & Bag, Inc., Shawano, WI (US)

( * ) Notice: Subject to any disclaimer, the term of this patent is extended or adjusted under 35 U.S.C. 154(b) by 0 days.

(21) Appl. No.: 14/029,951

(22) Filed: Sep. 18, 2013

(65) Prior Publication Data
US 2014/0014749 A1    Jan. 16, 2014

Related U.S. Application Data

(63) Continuation of application No. 13/024,088, filed on Feb. 9, 2011, now Pat. No. 8,567,702.

(51) Int. Cl.
*B02C 19/00* (2006.01)

(52) U.S. Cl.
USPC .......... 241/78; 241/81; 241/101.2; 241/152.2

(58) Field of Classification Search
USPC .................. 241/152.2, 101.2, 81, 78, 79.1
See application file for complete search history.

(56) References Cited

U.S. PATENT DOCUMENTS

| | | | |
|---|---|---|---|
| 3,193,877 | A | 7/1965 | Edwards |
| 3,455,357 | A | 7/1969 | Zink |
| 3,720,645 | A | 3/1973 | Nistri et al. |
| 4,255,295 | A | 3/1981 | Regnault et al. |
| 4,391,971 | A | 7/1983 | Massey et al. |
| 4,453,905 | A | 6/1984 | Bennett |
| 5,225,130 | A | 7/1993 | Deiringer |

(Continued)

FOREIGN PATENT DOCUMENTS

EP    0893220    1/1999

OTHER PUBLICATIONS

Resch, M. et al: "Vermischte Und Verschmutzte Altkunststoffe Stofflich Verwerten", Kunstoffe International, Carl Hanser Verlag, Munchen, DE, vol. 80, No. 4, Apr. 1, 1990, pp. 493-495, XP000173800, ISSN: 0023-5563, p. 494, left-hand column, para. 2 and right-hand column, para 1.

(Continued)

*Primary Examiner* — Mark Rosenbaum
(74) *Attorney, Agent, or Firm* — Reinhart Boerner Van Deuren s.c.

(57) ABSTRACT

A system for processing a supply of post consumer scrap linear low density or low density polyethylene film into near-virgin quality blown film product. The system includes tearing the supply of film in a shredder, wherein the surface area of the film is exposed, including delaminating the film. The torn supply of film is washed in a water bath including a surfactant. The film is agitated in the bath containing the surfactant wherein contaminants on the film are removed from the film. The washed film is ground into smaller pieces and additional washing of the ground film in a rotating friction washer occurs wherein additional contaminants are removed from the film. The ground film is then dried in a dryer and compacted in a compactor without addition of water into granulated objects of near-virgin quality blown film product.

16 Claims, 2 Drawing Sheets

(56) References Cited

U.S. PATENT DOCUMENTS

| | | |
|---|---|---|
| 5,236,603 A | 8/1993 | Sampson |
| 5,419,634 A | 5/1995 | Bacher et al. |
| 5,540,244 A | 7/1996 | Brooks et al. |
| 5,876,644 A | 3/1999 | Nichols et al. |
| 5,945,460 A | 8/1999 | Ekart et al. |
| 5,951,940 A | 9/1999 | Nosker et al. |
| 5,977,294 A | 11/1999 | Hoehn |
| 6,056,901 A | 5/2000 | Hamatani et al. |
| 6,436,322 B1 | 8/2002 | Fredl |
| 6,455,667 B1 | 9/2002 | Kimura et al. |
| 6,607,299 B1 | 8/2003 | Bacher et al. |
| 6,838,496 B1 | 1/2005 | Goedicke et al. |
| 7,244,813 B2 | 7/2007 | Dong et al. |
| 7,380,973 B2 | 6/2008 | Goedicke et al. |
| 2008/0039540 A1 | 2/2008 | Reitz |

OTHER PUBLICATIONS

"Abbaubare Und Losliche Kunststoffe Eroffnen Neue Markte. Orecycle '88", Plastverarbeiter, Huethig GmbH, Heidelberg, DE, vol. 40, No. 1, Jan. 1, 1989 (Feb. 2, 1989), pp. 118/119, XP000080360, ISSN: 0032-1338, p. 119, col. 2-col. 4, col. 5, line 15-line 36, figure 3.

Lietz, G.: Wiederaufbereiten von PE-Folienabfallen, Kunstoffe International, Carl Hanser Verlag, Kunchen, DE, vol. 73, No. 8, Aug. 1, 1983, pp. 414-418, XP002095855, ISSN: 0023-5563, p. 416, right-hand dolumn, paragrap 3, col. 2, line 5-line 6; col. 2, line 65-line 66; col. 5, line 1-line 2; col. 5, line 27-line 31; col. 6, line 12-line 29.

POST CONSUMER SCRAP FILM RECYCLING SYSTEM

CROSS-REFERENCE TO RELATED APPLICATIONS

This application is a continuation of U.S. patent application Ser. No. 13/024,088, filed on Feb. 9, 2011, which patent application is hereby incorporated herein, in its entirety, by reference.

BACKGROUND OF THE INVENTION

Field of the Invention

The present invention relates to a system for recycling scrap, and more particularly to a system for recycling post-consumer scrap linear low density polyethylene film and post-consumer low density polyethylene film.

Recycling of post-consumer plastic waste has received considerable publicity as being environmentally correct and "green". It is known that the majority of municipal, mixed post-consumer plastic waste includes polyethylene perephthalathe (PET) materials, such as used in soda bottles and unpigmented high density polyethylene (HDPE) materials, such as milk bottles. In a typical recycling procedure, the containers composed of PET and HDPE are separated from other waste which are then shredded into smaller pieces, cleaned, heated and extruded or granulized for reuse as other products.

One type of post-consumer scrap (PC) that has been difficult to recycle is polyethylene film. Typically, the PC film material is a "stretch wrap" linear low density polyethylene (LLDPE). Because of the strength characteristics and the stretch characteristic of the LLDPE such film is used as a baling material and wrap material for palletized loads or baling processes. Another type of PC film is low density polyethylene (LDPE) used as a wrap and as a bag.

LLDPE film is used in wrapping and securing boxes, containers, or similar items on a pallet during shipping. Upon arrival at a given destination, such PC film is removed from the palletized materials and scrapped. Such PC film typically has labels that are glued onto the outside of the film as well as various markings that are placed on the film during the shipping process. The PC film typically is wrapped around the materials on the pallets several times so that there are layers upon layers of the film.

PC film is also used to bale other scrap material. When PC film is removed from the pallets or other bales, because of the high level of contamination such as dirt, oil, biological material, layering, label adhesives, etc. the PC film is either tossed in a landfill or processed as a filler for other plastic products. Reuse of the PC film as a viable blown film product for use as industrial film or a bag product has generally not been instituted. Typically, such used film has limited use due to high level of contamination present which, in turn, causes severe processing issues as well as unpleasant properties in the finished product, for example, odor, discoloration and "pitted" appearance.

The apparatus implementing the present disclosure must also be of construction which is both durable and long lasting, and it should also require little or no maintenance to be provided by the user throughout its operating lifetime. In order to enhance the market appeal of the apparatus of the present disclosure, it should also be of inexpensive construction to thereby afford it the broadest possible market. Finally, it is also an objective that all of the aforesaid advantages and objectives be achieved without incurring any substantial relative disadvantage.

The subject matter discussed in this background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions.

SUMMARY OF THE INVENTION

The disadvantages and limitations of the background art discussed above are overcome by the present disclosure.

There is provided a system for processing a supply of post-consumer scrap linear low density polyethylene film or low density polyethylene film into near-virgin quality blown film product. The system includes a shredder configured to tear the supply of multilayered film in the shredder. The shredder exposes the surface area of the film and delaminates the film. The torn film then goes into a water bath apparatus configured to wash the torn film in the water bath which includes a surfactant and agitating the film in the bath. Contaminates are removes from the delaminated film in the water bath. From the water bath, the film is moved into a grinder which is configured to grind the film. The ground film is then moved to a plurality of rotating friction washers configured to wash the ground film, wherein additional contaminants are removed from the film. A dryer is configured to dry the ground film resulting in the ground film containing not more than 10% by weight, water content. The dried film is compacted in a compactor configured to compact the dry, ground film, without additional water, into granulated objects of mere virgin quality blown film product. A conveyor network interconnects the various system equipment, with the conveyor network including one of a storage conveyor, inclined conveyer, discharge belt, transport screw, and pneumatic transport tube.

In another embodiment, the water bath may include a plurality of washers with at least one washer containing hot water. In a washer that contains hot water, the hot water is at least 140° F. and not more than 190° F.

In another embodiment, the system includes a detector configured to detect metal in the supply of film and includes subjecting the supply of film to a magnetic field to identify ferrous metal. Any ferrous metal detected is removed from the supply of film by a machine or by manual removal. The system may also include a detector configured as an x-ray machine to detect a non-film object.

The system may also include a granulator that is configured to form the granulated objects after the compacting by the compactor into pellets.

There is further provided a system for processing post-consumer scrap film into a near virgin quality blown film product with the film including one of a supply of multi-layer recyclable linear low density polyethylene plastic film and a supply of multi-layer recyclable low density polyethylene plastic film.

The system includes a detector configured to detect a non-film object in the supply of film. The detector may be configured as one of an x-ray producing apparatus and a magnetic field producing apparatus. The system further includes a machine configured to remove the non-film object detected in the film. The removal can be by machine or manual removal. The system includes a shredder configured to shred the supply of multi-layer plastic film after removal of the non-film object and to tear the shredded film exposing the delaminated surface area of the film. A filter screen is configured to receive and filter the shredded plastic film.

A water bath apparatus is configured to receive the filtered film from the filter screen. An agitator is coupled to the water bath apparatus and configured to agitate the water in the water bath apparatus to further delaminate and wet all surfaces of the shredded plastic film.

A wet grinder apparatus is configured to receive the shredded plastic film from the water bath, with the wet grinder configured to grind the plastic film. A rotating friction washer is configured to receive the wet ground plastic film, with the rotating friction washer configured to wash the ground plastic film wherein contaminants are removed. A cyclone apparatus is configured to receive the ground plastic film from the rotating friction washer, with the cyclone configured to separate a light, by weight, plastic film from a heavy, by weight, plastic film.

A pair of dryer apparatus, with one dryer apparatus configured to receive the light plastic film and one dryer apparatus configured to receive the heavy plastic film, with both dryer apparatuses configured to dry the plastic film so that the film contains not more than 10%, by weight, water content.

A compactor apparatus is configured to compact the dried plastic film received from the dryer apparatus, without the addition of water, into granulated objects of near virgin quality plastic and store the granulated objects in a storage apparatus configured to receive the objects of near virgin quality plastic film.

The method of processing the supply of film can include at least one of the washing processes in hot water having a temperature of at least 140° F. but not more than 190° F. During the process, metal is detected in the supply of film and removed from the supply prior to the grinding process.

There is also provided a method for processing post-consumer scrap film into a near-virgin quality blown film product. The method includes providing one of a supply of recyclable linear low density polyethylene plastic film and a supply of low density polyethylene plastic film and removing the metal from the supply of plastic film. The plastic film is shredded after metal removal with the shredding process tearing the plastic film and exposing the surface area of the film. The shredded plastic film is discharged through a filter screen to a water bath wherein the shredded plastic film is agitated to wet all the surfaces of the shredded plastic film. The plastic film is then removed from the water bath and a wet grinding of the plastic film occurs.

The ground plastic film is washed again in a rotating friction washer wherein contaminants are removed from the plastic film. At least two different types of the washed ground plastic film is separated in a hydrocyclone wherein lighter plastic film is separated from heavier plastic film. The ground plastic film is dried and compacted without the addition of water into granulated objects of near-virgin quality linear low and low density polyethylene plastic. The granulated objects are then either stored or used as raw material in a blown film operation.

There is further provided a method for processing post-consumer scrap film into a near-virgin quality blown film product. The method includes providing one of a supply of recyclable linear low density polyethylene plastic film and a supply of low density polyethylene plastic film and removing the metal from the supply of plastic film. The plastic film is then shredded after metal removal wherein the plastic film is torn exposing the surface area of the film. The shredded plastic film is discharged through a filter screen to a water bath where the film is agitated to wet all the surfaces of the shredded plastic film. The water bath includes a surfactant, for example, a detergent additive to assist in removal of contaminants. The washed plastic film is removed from the water bath and wet ground. The then ground plastic film is washed again in a rotating friction washer where additional contaminants are removed from the plastic film.

The plastic film is subjected to a hydrocyclone for separating at least two different types of the washed ground plastic film. The lighter plastic film is separated from heavier plastic film in the hydrocyclone. The ground plastic film is dried so that it contains not more than 10 percent, by weight, water content. The dried ground plastic film is compacted, without the addition of water, into granulated objects of near-virgin quality polyethylene plastic and is either stored or used as raw material in a blown film operation. The granulated plastic film can also be formed into pellets after the compacting step.

The apparatus to implement the present disclosure is of a construction which is both durable and long lasting, and which will require little or no maintenance to be provided by the user throughout its operating lifetime. The apparatus of the present disclosure is also of inexpensive construction to enhance its market appeal and to thereby afford it the broadest possible market. Finally, all of the aforesaid advantages and objectives are achieved without incurring any substantial relative disadvantage.

DESCRIPTION OF THE DRAWINGS

These and other advantages of the present invention are best understood with reference to the drawings, in which.

DETAILED DESCRIPTION OF THE EXEMPLARY EMBODIMENTS

There is provided a method and apparatus for recycling post-consumer scrap (PC) such as PC film which is difficult to recycle because of labels that are glued on the outside of the film as well as various markings that are placed on the film during the shipping process and other contaminates. In order to provide a viable blown film product that can be reused, the labeling, adhesives, other applied markings, and contaminates have to be removed from the PC film. It is the objective of the present disclosure to process the PC film (LLDPE and LDPE) into a near-virgin quality blown film product that can be used by itself or combined with virgin material.

For purposes of this application the term "near-virgin" shall mean a quality of the PC film compared to virgin material of blown film product. A test for such quality is a visual gel detection test. For purposes of this Application a "gel" is an unmelted portion of PC film or unmelted contaminate. In the test, the number of gels, independent of their size, are determined on a 12 inch by 12 inch square sample. Virgin material has a gel count of between 10 and 0 gels. Near-virgin material has a gel count of between 1,000 and 11 gels. The Applicants have compared a conventional PC product to a PC product produced with the method and apparatus of the present disclosure, resulting in the following:

| Film Type | Gel Count |
| --- | --- |
| Conventional PC | 52,740 |
| Present Disclosure PC | 720 |
| Virgin Material | 9 |

Figure 1:
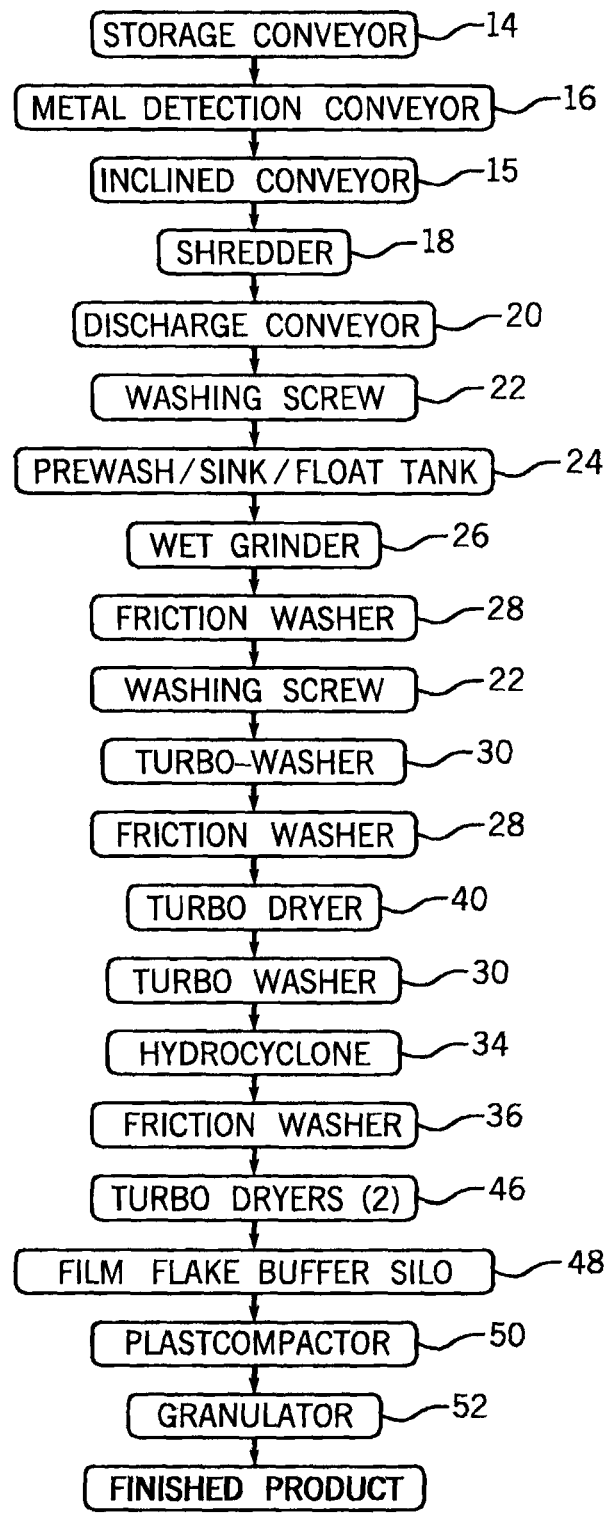
FIG. 1 is a flow chart of an exemplary embodiment of a process for recycling post-consumer scrap (PC) film.
Figure 2:
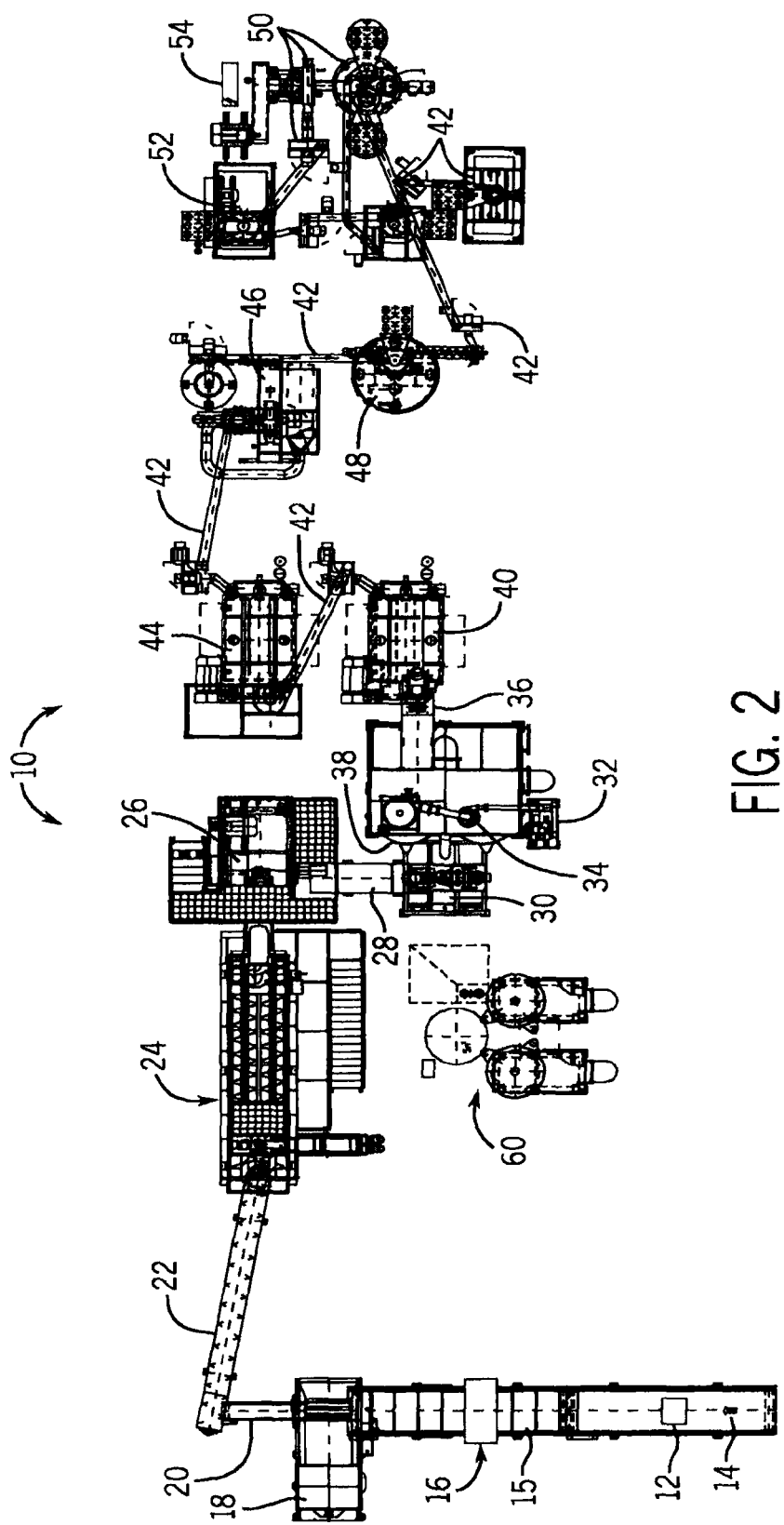
FIG. 2 is a schematic top view of an apparatus configured to process PC film in accord with the flow chart illustrated in FIG. 1.

Referring to the Figures, FIG. 1 is a flow chart of an exemplary embodiment of a process for recycling post consumer scrap film into a near-virgin quality blown film product. FIG. 2 is a schematic top view of exemplary embodiments of an apparatus layout configured to process PC film in accord with the flow chart illustrated in FIG. 1. It should be understood that the physical layout of the equipment, as illustrated in FIG. 2, is exemplary and other configurations or equipment layouts are contemplated that can be arranged within the confines of the particular facility which utilizes the methods described herein.

A supply of post consumer scrap linear low density polyethylene film or low density polyethylene film or a combination of LLDPE and LDPE film 12 (hereinafter "PC film") is placed on a storage conveyor 14. Placement of the supply of PC film 12 on the conveyor 14 can be by any convenient and conventional method such as a forklift, crane, hoist, and in some instances manual disposition. The storage conveyor 14 moves the supply of PC film 12 to an incline conveyor 15.

The supply of PC film 12 typically is presented in bales held together by retainer bands. In a typical operation, the retainer bands are cut and the bale is pulled apart for initial visual inspection. Such process can be done manually or by a machine as determined by the operator. If any non-film objects are initially seen in the supply of PC film 12, such objects are removed either manually or by machine.

The unbaled supply of PC film 12 is then moved by the storage conveyor 14 to a conveyor 15 through or near a metal detector 16 to facilitate removal of certain forms of metal. The metal detector 16 typically is an induction metal detector which has several forms of magnets, for example electromagnets, to detect and assist in removal of ferrous materials automatically. It is also contemplated that a series of permanent magnets within appropriate distances to the supply of PC film 12 can also be used to detect and/or remove ferrous metal objects. Other types of detectors, for example an x-ray machine, can also be used to detect non-film objects.

The incline conveyor 15 moves the supply of PC film 12 to a shredder 18, for example a Vecoplan or Wiema shredder that is configured to tear-shred the PC film into chunks and pieces and discharges the shredded film through a screen. The screen size and resultant film surface area may vary depending upon operational requirements. One example of a screen is one that has a plurality of 3-inch openings.

The shredder 18 is configured to tear the supply of PC film 12 wherein a surface area of the film is exposed. The shredder 18 also delaminates the film. Because of typical shipping wrap process, the PC film is layered one layer on top of another and the shredder 18 is configured to delaminate such layers, i.e. separate the film layers from one another. A shredder configured to cut the film, typically fuses the film layers making cleaning the film difficult, if not impossible.

The shredded supply of PC film is moved by a discharge belt 20 to a wash and transport screw 22. The wash and transport screw 22 wets the shredded film and conveys the film to a prewash/sink/float tank apparatus 24. While in the float/sink 24 apparatus, further separation of high density materials not recognized by the metal detector 16, for example stone, glass, or sand, sink to the bottom of the apparatus 24 for later removal. While in the float/sink/float tank apparatus 24 the film is further made wet by agitation, performed, for example by a series of rotating paddles.

Additional cleaning of the PC film is accomplished, while in the wash tank 24, by surfactants, for example, detergents, and other compounds mixed in the tank to further clean the film of all contaminants, such as inks, adhesives, etc.

Surfactants are substances that are added to liquids to reduce the surface tension of the liquid thereby increasing the liquid's spreading and wetting properties. Surfactants are used to disperse aqueous suspensions of insoluble dyes, for example. Such additives also soften adhesives used to attach labels to the PC film. A preferred surfactant will include a detergent, an oxidizer, and a bleaching agent. It should be understood that the surfactant may include other chemicals or additives, including ionic and non-ionic agents. In addition to the cleaning of the PC film, while in the sink/float tank apparatus 24, the agitation also promotes delamination of the PC film which has a tendency to stick to itself.

After a period of time as determined by the operator, the PC film fragments are conveyed to a first granular 26. The first granular 26 further reduces in size the PC film area received from the shredder and sink/float tank 24. A typical particle size after the first granulation process is approximately three-quarters of an inch. The granulation process in the first granulator 26 also promotes further separation of wet labels from the film substrate. From the first granulator 26, the PC film is conveyed to a friction washer 28.

The granulated PC film is washed in the friction washer 28 which is configured with an inclined cylindrical trough and an incline fast running paddle screw to dewater and clean ground material discharged from the first granulator 26. The screw is fixed in the housing by means of bearings and enclosed in a stainless steel screen. The shredded and granulated material and water are fed at the lower end of the trough with the screw transporting the material upward and spinning at a speed, for example 1,000 rpms.

The granulated PC film is washed in the friction washer 28 while it is being transported to the outlet at the top of the trough. The contaminates and the water are passed through the fine stainless steel screen to the trough wall while the friction of the high speed screw further cleans the PC film. It should be understood that the friction washer 28 can be positioned in front of or after washing tanks. As illustrated in FIG. 1, the friction washer 28 is positioned after a turbo washer 30. A friction washer 28 is also positioned after the wet grinder 26 as illustrated in FIG. 1. In FIG. 2, the turbo washer 30 is positioned after the friction washer 28.

The granulated supply of PC film 12 is moved by a pump 32 to a water cyclone, also referred to as a hydrocyclone 34, such as for example a hydrocyclone produced by Herbold Meckesheim. The hydrocyclone 34 operates under water pressure from the pump 32 which moves water in a spiral to further separate contaminates from the PC film and further separate layers of the PC film by rotational forces of the moving water within the hydrocyclone 34.

The PC film leaves the hydrocyclone 34 at its upper end with the main stream of water, with any sinking material (higher density material) at the lower end. The hydrocyclone 34 operates in conjunction with the pump 32 and the turbo washer 30 to provide additional cleansing of the PC film and separation of contaminants from the PC film. The water from the hydrocyclone 34 continues to transport the contaminates to a vibrating screening apparatus 38 and a second friction washer 36.

Operation of the turbo washer 30 can be either with cold water or hot water. In the case of a hot water bath, the temperature can be in the range of 120° F. to 170° F., with the preferred temperature being a water temperature of at least 140° F. but not more than about 190° F. The hot water is used to affect additional cleaning of the PC film in the washer in addition to the rotary motion imparted to the PC film. Temperatures over 190° F. tend to distort and/or melt the PC film.

Upon exiting the second friction washer 36, the PC film is deposited in a second turbo dryer 40. The turbo dryer 40 removes moisture from the PC film and through a pneumatic transport system 42 deposits the PC film in a second turbo dryer 44. The second turbo dryer 44 removes additional moisture from the PC film. The PC film now is typically in the form of flakes and is then deposited in a film flake buffer silo 48.

Additional drying is performed in a thermal drying apparatus 46 which uses heat to remove additional moisture from the PC flakes. A series of pneumatic transport tubes and system 42 interconnect the first turbo dryer 40, the second turbo dryer 44, the thermal drying apparatus 46, and a film flake buffer silo 48. It should be understood that additional turbo dryer and thermal drying apparatuses can be installed in the system and coupled to pneumatic transport tubes.

From the film flake buffer silo 48, a pneumatic transport system tube 42 moves the PC film flakes to a plastcompactor apparatus 50, which may be any commercially available such device. In one such plastcompactor, the plastcompactor 50 operates with a rotating and a fixed compaction disk with both disks configured with a screw-fitted and replaceable kneading rails. The PC film is conveyed continuously from the feed silo 48 through the center of the fixed disk into the processing area of the plastcompactor 50 by means of a feed screw. The material is rapidly heated up by the friction against and between the compactor disks. During the operation in the plastcompactor apparatus, the PC material is warmed up because of friction and starts to soften. The PC surfaces start to fuse resulting in worm-shaped formations. The additional heating in the plastcompactor 50 further reduces moisture in the PC film. In a typical operation of the methods described herein, the PC film has a moisture content of not more than 10% by weight.

From the plastcompactor apparatus 50 the worm-shaped formations are moved to a second granulator 52 which reduces the worm-shaped formations to the required agglomerated granulated object size. The specific size of the agglomerated PC film is selected by changing a screen inside the second granulator 52. The plastcompactor apparatus 50 further removes any additional moisture from the PC film and compacts the dry ground film, without addition of water, into the granulated objects of near-virgin quality blown film product.

In one embodiment of the method, a controller 54 is used to control the various functions of the apparatus including water temperatures, air pressures time periods, a specific machine granular size, and speed of operation.

The controller 54 may be a microprocessor coupled to the various apparatus of the system. The controller 54 may also be a server coupled to an array of peripherals or a desktop computer, or a laptop computer, or a smart-phone. It is also contemplated that the controller is configured to control each individual machine and may be remote from any of the apparatus. Communication between the controller 54 and the various apparatus may be either by hardwire or wireless devices. A memory/data base coupled to the controller may be remote from the controller 54. The controller 54 typically includes an input device, for example a mouse, or a keyboard, and a display device, for example a monitor screen or a smart phone. Such devices can be hardwired to the controller or connected wirelessly with appropriate software, firmware, and hardware. The display device may also include a printer coupled to the controller 54. The display device may be configured to mail or fax reports as determined by a user. The controller 54 may be coupled to a network, for example, a local area network or a wide area network, which can be one of a hardwire network and a wireless network, for example a Bluetooth network or internet network, for example, by a WIFI connection or "cloud" connection.

In another embodiment a water treatment apparatus 60 is coupled to the various wash apparatus to recycle and filter the water used within the system for continued use. The quality of the water will vary at various stages of the process, with the recycling and filtering of the water controlled by the operator and/or in conjunction with the controller 54.

In a further embodiment, one or more testing stations are installed to test the quality of the PC film being processed. One such test is the "gel count" test described above, however, other appropriate tests can be implemented as determined by the operator. The test stations can be coupled to the controller 54 to automatically monitor, test and report results by configuring the controller 54. Testing is typically performed at various stages of the process as determined by the operator.

For purposes of this disclosure, the term "coupled" means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or the two components and any additional member being attached to one another. Such adjoining may be permanent in nature or alternatively be removable or releasable in nature.

Although the foregoing description of the present process and apparatus has been shown and described with reference to particular embodiments and applications thereof, it has been presented for purposes of illustration and description and is not intended to be exhaustive or to limit the disclosure to the particular embodiments and applications disclosed. It will be apparent to those having ordinary skill in the art that a number of changes, modifications, variations, or alterations to the process and apparatus as described herein may be made, none of which depart from the spirit or scope of the present disclosure. The particular embodiments and applications were chosen and described to provide the best illustration of the principles of the process and its practical application to thereby enable one of ordinary skill in the art to utilize the process and apparatus in various embodiments and with various modifications as are suited to the particular use contemplated. All such changes, modifications, variations, and alterations should therefore be seen as being within the scope of the present disclosure as determined by the appended claims when interpreted in accordance with the breadth to which they are fairly, legally, and equitably entitled.

While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be claimed alone or in combination with any of the features, elements, or components of any of the other embodiments discussed above.

What is claimed is:

1. A system for processing a supply of post-consumer scrap linear low density polyethylene film or low density polyethylene film into near-virgin quality blown film product, comprising:
   a shredder configured to tear the supply of post-consumer scrap linear low density polyethylene film or low density polyethylene film in the shredder, wherein surface area of the film is exposed, including delaminating the film;
   a water bath configured to wash the torn film in the water bath including a surfactant and agitating the film in the bath, wherein contaminates are removed from the delaminated film;
   a grinder configured to grind the film;
   a plurality of rotating friction washers configured to wash the ground film, wherein additional contaminates are removed from the film;
   a dryer configured to dry the ground film resulting in the ground film containing not more than 10% by weight, water content;
   a compactor configured to compact the dry, ground film, without addition of water, into granulated objects of near-virgin quality blown film product; and
   a conveyor network interconnecting the various systems equipment, with the conveyor network including one of a storage conveyor, incline conveyor, discharge belt, transport screw, and pneumatic transport tube.

2. The system for processing the supply of film of claim 1, wherein the water bath includes a plurality of washers.

3. The system for processing the supply of film of claim 2, wherein at least one of the washers contains hot water.

4. The system for processing the supply of film of claim 3 wherein the hot water is at least 140° F. and not more than 190° F.

5. The system for processing the supply of film of claim 1, further comprising a detector configured to detect metal in the supply of film and includes subjecting the supply of film to a magnetic field to identify ferrous metal.

6. The system for processing the supply of film of claim 5, further comprising a machine configured to remove detected ferrous metal.

7. The system for processing the supply of film of claim 5, further comprising a manual removal station configured to facilitate a manual removal of detected metal.

8. The system for processing the supply of film of claim 1, further comprising a granulator configured to form the granulated objects into pellets after the compacting step.

9. The system for processing the supply of film of claim 1, further comprising a detector configured as an x-ray machine to detect a non-film object.

10. A system for processing post-consumer scrap film into a near-virgin quality blown film product with the film including one of a supply of multi-layer recyclable linear low density polyethylene plastic film and a supply of multi-layer recyclable low density polyethylene plastic film, the system comprising:
   a detector configured to detect a non-film object in the supply of film;
   a machine configured to remove the non-film object detected in the film;
   a shredder configured to shred the supply of multi-layer plastic film after removal of the non-film object and to tear the shredded film exposing a delaminated surface area of the film;
   a filter screen configured to receive and filter the shredded plastic film;
   a water bath apparatus configured to receive the filtered film from the filter screen;
   an agitator coupled to the water bath apparatus configured to agitate water in the water bath apparatus to further delaminate and wet all surfaces of the shredded plastic film;
   a wet grinder apparatus is configured to receive the shredded plastic film from the water bath, with the wet grinder configured to grind the plastic film;
   a rotating friction washer configured to receive the wet ground plastic film, with the rotating friction washer configured to wash the ground plastic film wherein contaminants are removed;
   a hydrocyclone configured to receive the ground plastic film from the rotating friction washer, with the hydrocyclone configured to separate a light, by weight, plastic film from a heavy, by weight, plastic film;
   a pair of dryer apparatus, with one dryer apparatus configured to receive the light plastic film and one dryer apparatus configured to receive the heavy plastic film, with both dryer apparatus configured to dry the plastic film so the film contains not more than 10%, by weight, water content;
   a compactor apparatus configured to compact the dry plastic film received from the dryer apparatus, without addition of water, into granulated objects of near-virgin quality plastic film; and
   a storage apparatus configured to receive the compacted granulated objects of near-virgin quality plastic film.

11. A system for processing post-consumer scrap film into a near-virgin quality blown film product of claim 10, wherein the non-film object is metal.

12. A system for processing post-consumer scrap film into a near-virgin quality blown film product of claim 10, wherein the detector is configured as one of an x-ray producing apparatus and a magnetic field producing apparatus.

13. The system for processing the supply of film of claim 10, wherein the water bath includes a plurality of washers.

14. The system for processing the supply of film of claim 13, wherein at least one of the washers contains hot water.

15. The system for processing the supply of film of claim 14, wherein the hot water is at least 140° F. and not more than 190° F.

16. A system for processing post-consumer scrap film into a near-virgin quality blown film product of claim 10, wherein the granulated objects are pellets.

* * * * *